Patented June 12, 1934

1,962,511

UNITED STATES PATENT OFFICE 1,962,511

COLORING RUBBER

Hans Krzikalla, Ludwigshafen-on-the-Rhine, Adolph Koch, Niedernhausen in Taunus, and Wilhelm Scheurer, Ludwigshafen - on - the-Rhine, Germany, assignors to General Aniline Works, Inc., New York, N. Y., a corporation of Delaware No Drawing. Application July 3, 1933, Serial No. 678,994. In Germany July 16, 1932

9 Claims. (Cl. 18—50)

The present invention relates to colored rubber and a process of producing same.

We have found that colored rubber products, namely rubber masses containing the same, can be obtained by mixing the said products with water-insoluble azo dyestuffs corresponding to the general formula:—

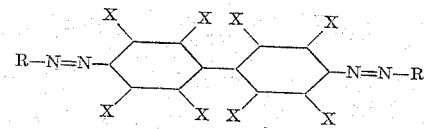

in which R represents the radicle of a hydroxynaphthoic acid amide and X stands for hydrogen or a substituent such as an alkyl group, an alkoxyl group, aralkyl and halogen, the said dyestuffs being free from nitro, sulpho and further carboxylic acid groups and subjecting the said mixtures to vulcanization. The dyestuffs to be employed are free from metals. Suitable tetrazo components are for example those obtainable by tetrazotizing the compounds corresponding to the formula

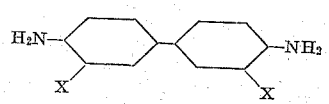

wherein each X stands for hydrogen, halogen or an alkyl, an alkoxyl or an aralkyl group.

The dyestuffs defined above are insoluble in rubber and stable to vulcanization; they yield, generally speaking, from violet to greenish-blue colors.

The following examples will further illustrate the nature of this invention but the invention is not restricted to these examples.

Example 1

100 parts of crepe rubber, 160 parts of chalk, 50 parts of kaolin, 2.5 parts of white mineral oil, 5 parts of zinc white, 0.15 part of diphenylguanidine, 1.0 part of mercaptobenzothiazoledisulphide, 1.5 parts of stearic acid, 3.0 parts of sulphur and 2.0 parts of the disazo dyestuff derived from 1 molecular proportion of tetrazotized benzidine and 2 molecular proportions of 2.3-hydroxynaphthoic-acid-anilide are treated on mixing rollers to form a mixture as homogeneous as possible. Then the mixture is vulcanized in the press for 12 minutes under a pressure of 3.5 atmospheres. A reddish-blue vulcanization product is obtained.

If instead of the said dyestuff that obtainable by using 1 molecular proportion of tolidine and 2 molecular proportions of 2.3-hydroxynaphthoic acid-anilide is used, the remaining conditions being the same as indicated in the preceding paragraph, a blue vulcanization product is obtained.

Example 2

If the dyestuff employed in paragraph 1 of Example 1 be replaced by an equal amount of the dyestuff derived from tetrazotized dianisidine and 2 molecular proportions of 2.3-hydroxynaphthoic-ortho-toluidide or 2.3-hydroxynaphthoic-beta-naphthylamide, beautiful deep blue colorations are obtained after vulcanization. Similar colors are obtained by employing dyestuffs derived for example from 2.6-hydroxynaphthoic acid arylides.

In the following table further dyestuffs according to the present invention suitable for dyeing rubber are enumerated. In the first column there are given the tetrazo components, in the second column the coupling components and in the third column the shades produced by the said dyestuffs on rubber after vulcanization.

| Dyestuff from— | | Shade on vulcanized rubber |
|---|---|---|
| Tetrazo component | Coupling component | |
| Dianisidine | 2.3 - hydroxynaphthoic - acid - para-chloranilide. | Blue. |
| Do | 2.3 - hydroxynaphthoic - acid - meta-chloranilide. | Do. |
| Do | 2.3 - hydroxynaphthoic - acid - 5-chlor-2-toluidide. | Do. |
| Do | 2.3 - hydroxynaphthoic - acid - meta-anisidide. | Do. |
| Do | 2.3 - hydroxynaphthoic - acid - 2.4-dimethoxy-5-chloranilide. | Do. |
| Do | 2.3 - hydroxynaphthoic - acid - 1-naphthylamide. | Do. |
| Do | 2.3 - hydroxynaphthoic - acid - anilide. | Do. |
| Do | 2.3-hydroxynaphthoic-acid-amide. | Do. |
| 3.3' - dichlor-benzidine. | 2.3-hydroxynaphthoic-acid-amide. | Reddish-blue. |
| Do | 2.3 - hydroxynaphthoic - acid - ortho-anisidide. | Red-violet. |
| Do | 2.3 - hydroxynaphthoic - acid - anilide. | Violet. |

Instead of the aforementioned coupling component those obtainable according to British Patent No. 374,548 may be used. Further compounds which may be used as coupling components are the derivatives obtainable by condensing ortho-, meta- or para-nitrobenzoic acid or a halide thereof with aniline or a nuclear alkoxyl-, alkyl- or halogen substituted aniline, reducing the nitro group in the resulting product and condensing the amino aroylamino compound produced with 2.3-hydroxynaphthoic acid.

What we claim is:—

1. The process of producing colored rubber products, which comprises mixing a rubber product with a water-insoluble azo-dyestuff corresponding to the general formula

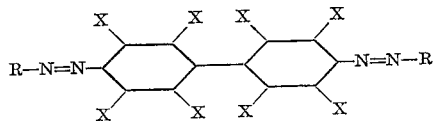

wherein X stands for hydrogen, halogen or an alkyl, an alkoxyl or an aralkyl group and R for the radicle of a hydroxynaphthoic acid amide, the said dyestuffs being free from nitro, sulpho and further carboxylic acid groups, and vulcanizing the mixture.

2. The process of producing colored rubber products which comprises mixing a rubber product with a water-insoluble azo-dyestuff corresponding to the general formula

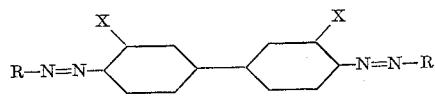

wherein X stands for hydrogen, halogen or an alkyl, an alkoxyl or an aralkyl group and R for the radicle of a hydroxynaphthoic acid amide, the said dyestuffs being free from nitro, sulpho and further carboxylic acid groups, and vulcanizing the mixture.

3. Colored rubber products containing a water-insoluble azo-dyestuff corresponding to the general formula

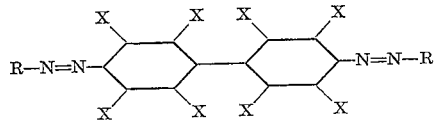

wherein X stands for hydrogen, halogen or an alkyl, an alkoxyl or an aralkyl group and R for the radicle of a hydroxynaphthoic acid amide, the said dyestuffs being free from nitro, sulpho and further carboxylic acid groups.

4. Colored rubber products containing a water-insoluble azo-dyestuff corresponding to the general formula

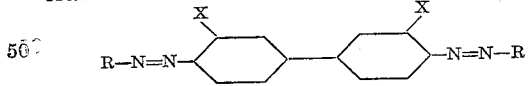

wherein X stands for hydrogen, halogen or an alkyl, an alkoxyl or an aralkyl group and R for the radicle of a hydroxynaphthoic acid amide, the said dyestuffs being free from nitro, sulpho and further carboxylic acid groups.

5. Colored rubber products containing a water-insoluble azo dyestuff corresponding to the formula

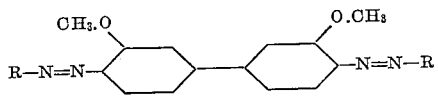

wherein R stands for the radicle of a hydroxynaphthoic acid amide, the said dyestuffs being free from nitro, sulpho and further carboxylic acid groups.

6. Colored rubber products containing the water-insoluble azo dyestuff corresponding to the formula

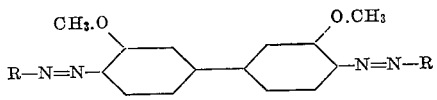

wherein R stands for the radicle of a 2.3-hydroxynaphthoic-acid-amide.

7. Colored rubber products containing the water-insoluble azo dyestuff corresponding to the formula

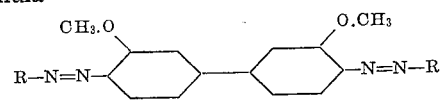

wherein R stands for the radicle of 2.3-hydroxynaphthoic-acid-anilide.

8. Colored rubber products containing the water-insoluble azo dyestuff corresponding to the formula

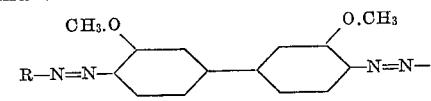

wherein R stands for the radicle of 2.3-hydroxynaphthoic acid-ortho-toluidide.

9. Colored rubber products containing the water-insoluble azo dyestuff corresponding to the formula

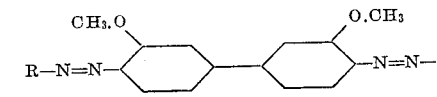

wherein R stands for the radicle of 2.3 hydroxynaphthoic acid-5-chlor-2-toluidide.

HANS KRZIKALLA.
ADOLPH KOCH.
WILHELM SCHEURER.